US012583218B2

(12) United States Patent
Kabeya

(10) Patent No.: US 12,583,218 B2
(45) Date of Patent: Mar. 24, 2026

(54) INKJET RECORDING APPARATUS AND INKJET RECORDING METHOD

(71) Applicant: FUJIFILM Business Innovation Corp., Tokyo (JP)

(72) Inventor: Mikitoshi Kabeya, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 236 days.

(21) Appl. No.: 18/189,320

(22) Filed: Mar. 24, 2023

(65) Prior Publication Data

US 2023/0311483 A1 Oct. 5, 2023

(30) Foreign Application Priority Data

Mar. 29, 2022 (JP) ................................ 2022-052976
Feb. 28, 2023 (JP) ................................ 2023-030045

(51) Int. Cl.
*B41J 2/045* (2006.01)
*B41J 2/21* (2006.01)

(52) U.S. Cl.
CPC ......... *B41J 2/0451* (2013.01); *B41J 2/04586* (2013.01); *B41J 2/2139* (2013.01); *B41J 2/2142* (2013.01); *B41J 2/2146* (2013.01)

(58) Field of Classification Search
CPC .... B41J 2/0451; B41J 2/04586; B41J 2/2139; B41J 2/2142; B41J 2/2146
See application file for complete search history.

(56) References Cited

U.S. PATENT DOCUMENTS 8,967,750 B2 * 3/2015 Ueshima .................... B41J 2/12 347/14
2013/0215178 A1 8/2013 Ueshima

FOREIGN PATENT DOCUMENTS

JP 2013-169760 A 9/2013
JP 2015-047724 A1 3/2015

* cited by examiner

*Primary Examiner* — Geoffrey S Mruk
(74) *Attorney, Agent, or Firm* — Oliff PLC

(57) ABSTRACT

An inkjet recording apparatus includes: plural nozzles that discharge ink droplets in accordance with image information to record an image on a recording medium; a detection unit that detects a defective nozzle from the plural nozzles; a non-discharge correction unit that performs non-discharge correction in which the defective nozzle detected by the detection unit is disabled from discharge and an amount of ink droplets from a nozzle that is adjacent to the defective nozzle is corrected; and a change unit that changes whether or not the non-discharge correction unit performs the non-discharge correction in accordance with a tone of the image information.

13 Claims, 15 Drawing Sheets

INKJET RECORDING APPARATUS AND INKJET RECORDING METHOD

CROSS-REFERENCE TO RELATED APPLICATIONS

This application is based on and claims priority under 35 USC 119 from Japanese Patent Application No. 2022-052976 filed Mar. 29, 2022 and Japanese Patent Application No. 2023-030045 filed Feb. 28, 2023.

BACKGROUND

(i) Technical Field

The present disclosure relates to an inkjet recording apparatus and an inkjet recording method.

(ii) Related Art

Technologies related to an inkjet recording apparatus have been proposed and disclosed in Japanese Unexamined Patent Application Publication No. 2013-169760, Japanese Unexamined Patent Application Publication No. 2015-047724, etc., for example.

Japanese Unexamined Patent Application Publication No. 2013-169760 describes a device including: a recording head that includes a plurality of nozzles that discharge liquid droplets; an abnormal nozzle detection unit that detects an abnormal discharge nozzle that exhibits a discharge abnormality from the plurality of nozzles; a storage unit that stores a correction value that is used to correct non-uniformities in an image due to the abnormal discharge nozzle; a droplet amount restriction unit that restricts the droplet amount of liquid droplets discharged from the abnormal discharge nozzle detected by the abnormal nozzle detection unit to a predetermined upper limit value or less, the upper limit value being less than the droplet amount of liquid droplets discharged from normal nozzles other than the abnormal discharge nozzle; a droplet amount correction unit that corrects the droplet amount of the liquid droplets discharged from the normal nozzles on the basis of the correction value stored in the storage unit; and an image recording unit that records an image on a recording medium by applying the liquid droplets discharged from the abnormal discharge nozzle and the normal nozzles of the recording head onto the recording medium while moving the recording head and the recording medium relative to each other.

Japanese Unexamined Patent Application Publication No. 2015-047724 describes an inkjet printing system that records an image using a single pass technique, the system including: a recording head that includes a plurality of nozzles; a non-discharge information storage section that stores position information on a non-discharge nozzle that is not usable to record an image, among the plurality of nozzles; a halftone processing section that quantizes an input image to generate a halftone image that indicates a dot pattern with multiple values of three values or more; and a non-discharge correction processing section that performs an image correction process on the input image or the halftone image on the basis of the position information on the non-discharge nozzle, the image correction process being performed to reduce the visibility of an image defect at a defective recorded portion due to the non-discharge nozzle, in which: the halftone processing section generates the halftone image in which tone expression is performed through an amplitude modulation (AM) dot or a halftone of a cluster type in which two or more dots are disposed aggregately in a nozzle arrangement direction of the recording head; and the system includes a non-discharge correction function to perform non-discharge correction in which a dot pattern for a non-discharge correction portion that is proximate to the defective recorded portion is generated by varying the correction strength of the non-discharge correction in accordance with the distance in the nozzle arrangement direction from an end portion of the cluster in which two or more dots are disposed aggregately in the nozzle arrangement direction.

SUMMARY

Aspects of non-limiting embodiments of the present disclosure relate to suppressing a reduction in image quality compared to the case where non-discharge correction is always performed when there occurs a defective nozzle that is not suitably used to record an image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an inkjet recording apparatus including: a plurality of nozzles that discharge ink droplets in accordance with image information to record an image on a recording medium; a detection unit that detects a defective nozzle from the plurality of nozzles; a non-discharge correction unit that performs non-discharge correction in which the defective nozzle detected by the detection unit is disabled from discharge and an amount of ink droplets from a nozzle that is adjacent to the defective nozzle is corrected; and a change unit that changes whether or not the non-discharge correction unit performs the non-discharge correction in accordance with a tone of the image information.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

First Exemplary Embodiment

Figure 1:
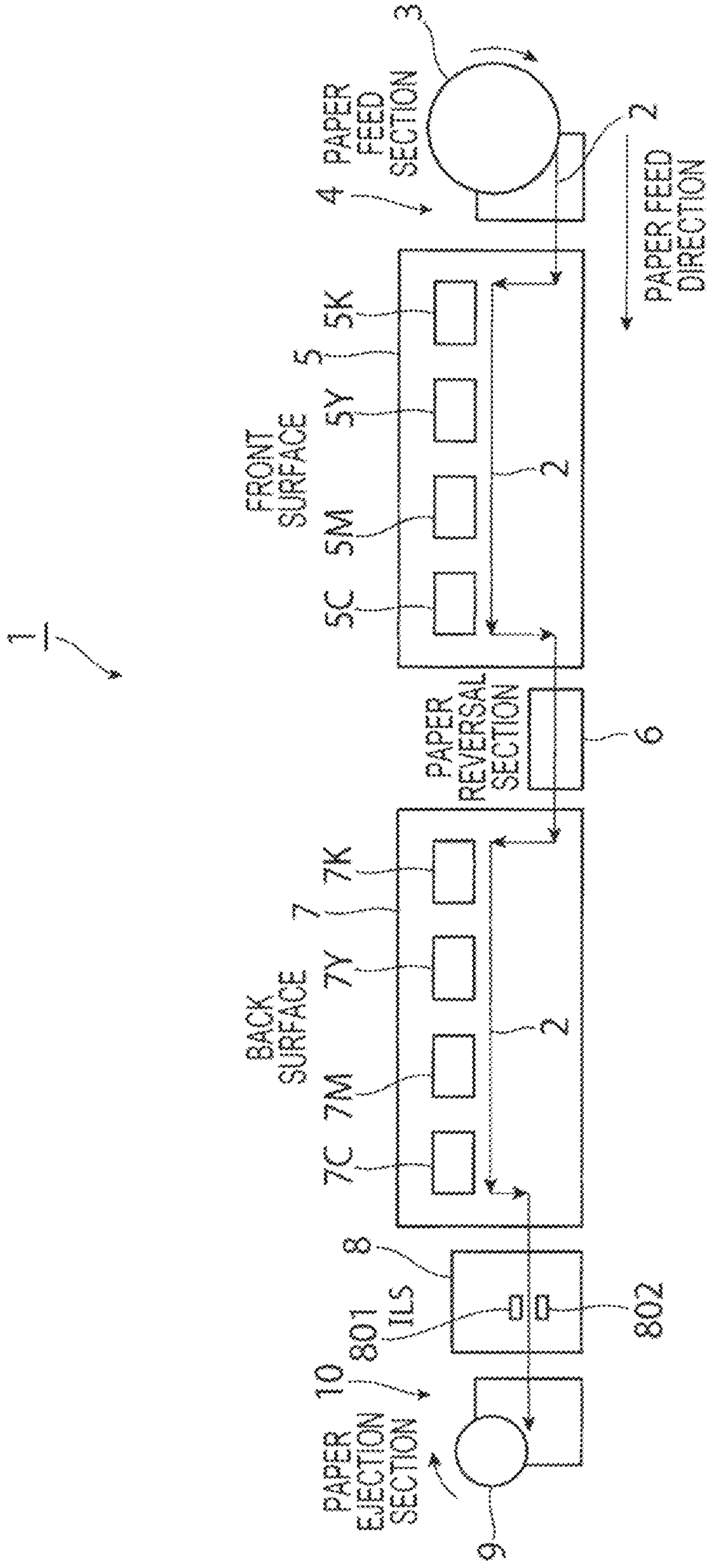
FIG. 1 illustrates the overall configuration of an inkjet recording apparatus according to a first exemplary embodiment of the present disclosure.

FIG. 1 is a diagram illustrating an overview of the entire inkjet recording apparatus that uses an inkjet recording method according to a first exemplary embodiment of the present disclosure.

<Configuration of Entire Inkjet Recording Apparatus>

An inkjet recording apparatus 1 according to the first exemplary embodiment is constituted as a color printer that forms a full-color image by an inkjet system on a recording medium using a single pass technique, for example. As illustrated in FIG. 1, the inkjet recording apparatus 1 roughly includes: a paper feed section 4 that supplies elongated paper 2 (hereinafter referred to as "continuous feed paper") that is continuous in a band shape from a paper feed roller 3 around which the continuous feed paper 2 is wound; a first image forming section 5 that forms an image on the front surface of the continuous feed paper 2 by the inkjet system; a paper reversal section 6 that reverses the front and back sides of the continuous feed paper 2; a second image forming section 7 that forms an image on the back surface of the continuous feed paper 2 by the inkjet system; a detection section 8 that detects an image formed on the front surface and/or the back surface of the continuous feed paper 2; and a paper ejection section 10 that winds the continuous feed paper 2 on which an image has been formed into a roll and ejects the continuous feed paper 2 as a paper ejection roller 9. The continuous feed paper may be elongated paper (recording medium) of a variety of materials with different ink impregnation rates such as regular paper, coated paper, and synthetic resin films, paper widths, basis weights, etc. The recording medium 2 is not limited to continuous feed paper, and may be so-called cut sheets that have been cut to prescribed sizes as a matter of course.

The paper feed section 4 includes the paper feed roller 3 which is rotatable and around which the continuous feed paper 2 is wound. The paper feed section 4 is able to supply the continuous feed paper 2 from the paper feed roller 3 at a transport speed determined in advance while a tension applying section (not illustrated) is applying a tension determined in advance.

The first image forming section 5 includes inkjet print heads 5K, 5Y, 5M, 5C corresponding to four colors such as black (K), yellow (Y), magenta (M), and cyan (C) that sequentially form images in the colors of black (K), yellow (Y), magenta (M), and cyan (C) on the front surface of the continuous feed paper 2 supplied from the paper feed section 4. The colors of images formed by the first image forming section 5 are not limited to the four colors of black (K), yellow (Y), magenta (M), and cyan (C), and may be other colors as a matter of course.

Figure 2A:
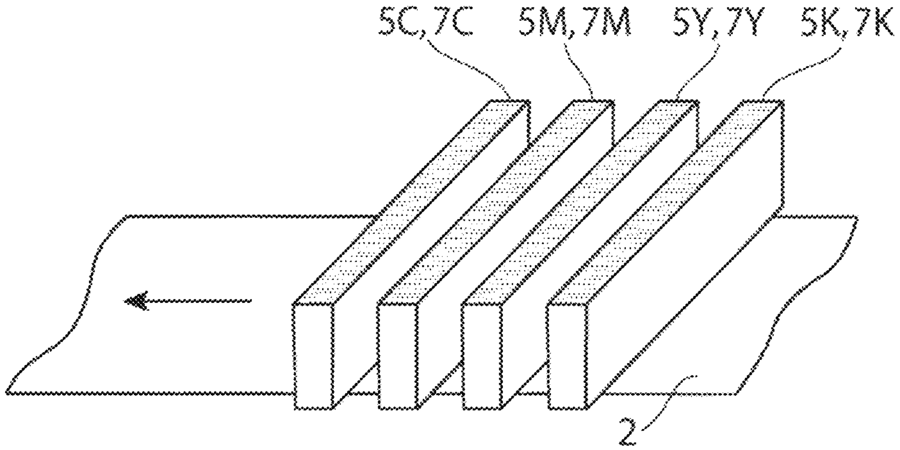
FIG. 2A is a perspective view illustrating the configuration of a recording section of the inkjet recording apparatus according to the first exemplary embodiment of the present disclosure.
Figure 2B:
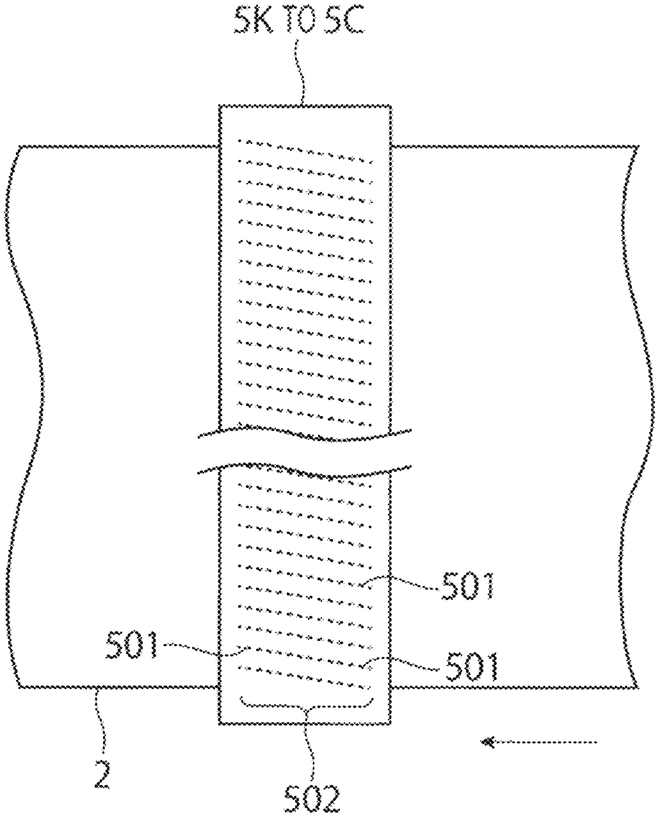
FIG. 2B illustrates the configuration of nozzles of an inkjet print head.

As illustrated in FIGS. 2A and 2B, the inkjet print heads 5K, 5Y, 5M, 5C corresponding to the colors of black (K), yellow (Y), magenta (M), and cyan (C) are disposed in parallel with each other at prescribed intervals along the transport direction of the continuous feed paper 2. The inkjet print heads 5K, 5Y, 5M, 5C are configured similarly except for the colors of images to be formed. The inkjet print heads 5K, 5Y, 5M, 5C each include a plurality of discharge nozzles 501, 501, . . . provided on the lower end surface to discharge ink droplets in accordance with image information. The plurality of discharge nozzles 501, 501, . . . are configured such that nozzle arrays 502, 502, . . . , in which a predetermined number of discharge nozzles 501, 501, . . . are arranged linearly at prescribed intervals along a direction inclined by an angle determined in advance with respect to the sub scanning direction which is the transport direction of the continuous feed paper 2, are disposed in parallel with each other at intervals determined in advance along the principal scanning direction which intersects the transport direction of the continuous feed paper 2. As a result, the plurality of discharge nozzles 501, 501, . . . are arranged along the principal scanning direction with a resolution determined in advance such as 1200 DIP (Dots Per Inch) or 2400 DPI.

As illustrated in FIG. 1, the paper reversal section 6 is configured to reverse the front and back sides of the continuous feed paper 2 while maintaining the position of the continuous feed paper 2 along the principal scanning direction by transporting the continuous feed paper 2 as wound around a plurality of transport rollers (not illustrated). The continuous feed paper 2, on the front surface of which an image has been formed by the first image forming section 5, is transported to the second image forming section 7 with the front and back sides reversed by the paper reversal section 6.

The second image forming section 7 includes inkjet print heads 7K, 7Y, 7M, 7C corresponding to four colors such as black (K), yellow (Y), magenta (M), and cyan (C) that sequentially form images in the colors of black (K), yellow (Y), magenta (M), and cyan (C) on the back surface of the continuous feed paper 2 transported from the paper reversal section 6. The inkjet print heads 7K, 7Y, 7M, 7C of the second image forming section 7 are configured similarly to those of the first image forming section 5 as illustrated in FIGS. 2A and 2B.

The detection section 8 includes inline sensors (ILSs) 801, 802 that detect the position of an image formed on the front surface and/or the back surface of the continuous feed paper 2. The detection section 8 detects the position, brightness, etc. of an image in each color formed by the inkjet print heads 5K, 5Y, 5M, 5C and the inkjet print heads 7K, 7Y, 7M, 7C by reading an image such as a test image formed on the front surface and/or the back surface of the continuous feed paper 2 at a prescribed image density (such as 1200 DPI) using the inline sensors 801, 802. A detection signal from the detection section 8 is input to a control device 100 to be discussed later.

The paper ejection section 10 is configured to wind the continuous feed paper 2, on the front surface and/or the back surface of which an image has been formed and which has passed through the detection section 8, into a roll and eject the continuous feed paper 2 as the paper ejection roller 9.

In order to form an image on the continuous feed paper 2 in the inkjet recording apparatus 1 configured as described above, first, as illustrated in FIG. 1, a new paper feed roller 3 around which the continuous feed paper 2 of a prescribed material and width has been wound is set to the paper feed section 4, and the distal end of the continuous feed paper 2 is led from the first image forming section 5 and passed through the paper reversal section 6, the second image forming section 7, and the detection section 8 to be wound around a core material (not illustrated) of the paper ejection roller 9 in the paper ejection section 10.

Then, in the inkjet recording apparatus 1, images in the four colors of black (K), yellow (Y), magenta (M), and cyan (C) are sequentially formed on the front surface and the back surface of the continuous feed paper 2 by the first and second image forming sections 5, 7 while transporting the continuous feed paper 2 at a prescribed transport speed and with prescribed tension with the paper feed section 4 supplying the continuous feed paper 2 and the paper ejection section 10 winding the continuous feed paper 2, and the continuous feed paper 2 on which images have been formed are wound as a paper ejection roller 9 in the paper ejection section 10.

The inkjet recording apparatus 1 configured as described above forms images in full colors etc. on the continuous feed paper 2 while continuously transporting the continuous feed paper 2. Therefore, the inkjet recording apparatus 1 may produce a large amount of defective printed matter on which an intended image is not formed when an abnormal nozzle is caused from the discharge nozzles 501, 501, . . . , 701, 701, . . . of the inkjet print heads 5K to 5C, 7K to 7C for black (K), yellow (Y), magenta (M), and cyan (C).

The "abnormal nozzle" may be a non-discharge nozzle or an abnormal discharge nozzle, for example. The non-discharge nozzle refers to a nozzle that is not able to discharge a normal amount of ink droplets, or that is not able to discharge any ink droplets at all, even through a shading correction process for increasing and decreasing the amount of ink to be discharged. The abnormal discharge nozzle refers to a nozzle that discharges ink droplets but that causes a discharge abnormality such as a discharge direction abnormality in which ink droplets fly with deviation or a droplet amount abnormality in which the amount of ink droplets to be discharged is more or less than the amount determined in advance. Hereinafter, a so-called deviation nozzle that causes deviation of flying ink droplets discharged from the discharge nozzles 501, 501, . . . , 701, 701, . . . before reaching the continuous feed paper 2 will be described as an example of the abnormal discharge nozzle. The deviation nozzle includes a nozzle with a droplet amount abnormality in which the amount of ink droplets to be discharged is less than the amount determined in advance.

The discharge defect of the discharge nozzles 501, 501, . . . , 701, 701, . . . of the inkjet print heads 5K to 5C, 7K to 7C is caused by a variety of factors such as occurrence of bubbles or clogging in the discharge nozzles 501, 501, . . . , 701, 701, . . . , adhesion of dust to the discharge nozzles 501, 501, . . . , 701, 701, . . . , or formation of an ink block, for example.

Therefore, in the inkjet recording apparatus 1 configured as described above, a test image is regularly recorded by the inkjet print heads 5K to 5C, 7K to 7C for black (K), yellow (Y), magenta (M), and cyan (C) to detect whether or not a discharge defect has been caused in any of the discharge nozzles 501, 501, . . . , 701, 701, . . . of the inkjet print heads 5K to 5C, 7K to 7C.

The timing to detect a discharge defect of the inkjet print heads 5K to 5C, 7K to 7C may be each time the paper feed roller 3 mounted to the paper feed section 4 is replaced with a new one, each time an image is formed on the continuous feed paper 2 for a length determined in advance, each time a certain time elapses since print operation is started, or a prescribed detection timing such as when at least one of the temperature and the humidity of the environment in which the inkjet recording apparatus 1 is installed is varied over a threshold or more, for example.

Figure 3:
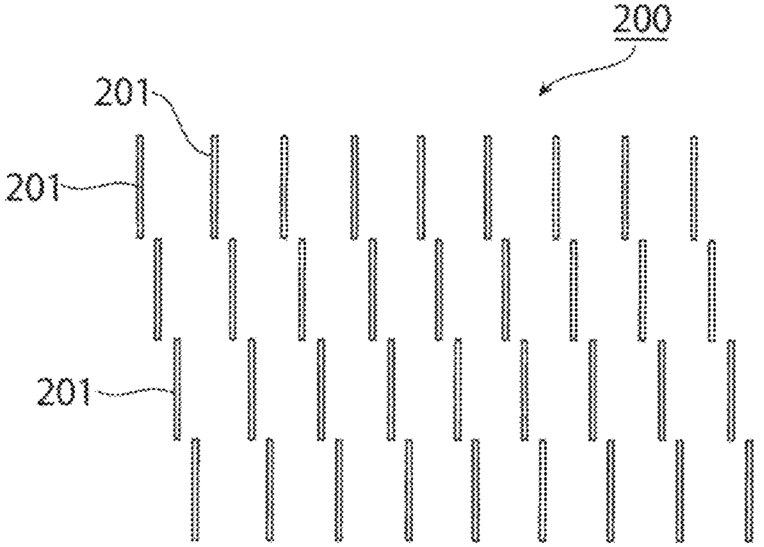
FIG. 3 is a plan view illustrating the configuration of a test image.

An example of the method of detecting a discharge defect of the inkjet print heads 5K to 5C, 7K to 7C includes printing a test chart 200, which is an example of the test image formed from images 201, 201, . . . formed linearly along the sub scanning direction and set to a density determined in advance, on the front surface and the back surface of the continuous feed paper 2 using the discharge nozzles 501, 501, . . . , 701, 701, . . . of the inkjet print heads 5K to 5C, 7K to 7C, as illustrated in FIG. 3, and detecting the position, brightness, etc. of the linear images 201, 201, . . . formed by the discharge nozzles 501, 501, . . . , 701, 701, . . . of the inkjet print heads 5K to 5C, 7K to 7C using the inline sensors 801, 802 of the detection section 8.

Figure 4:
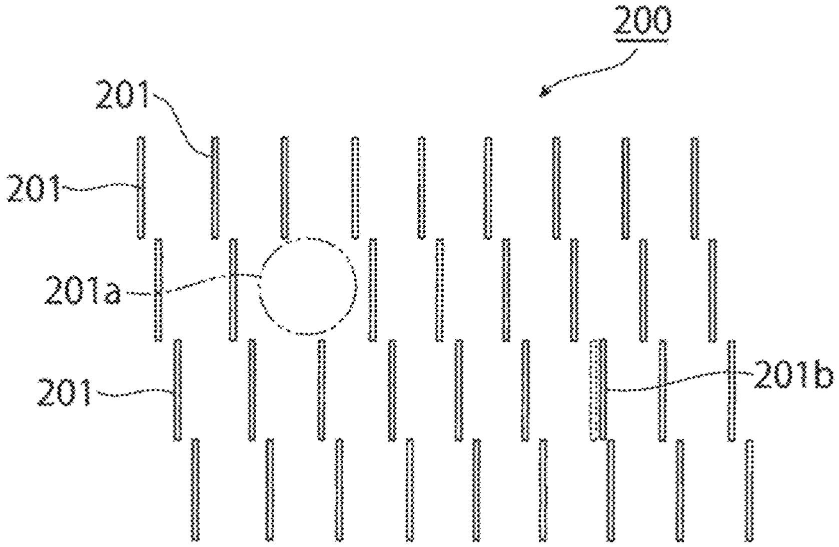
FIG. 4 is a plan view illustrating the configuration of the actual test image.

In the case where ink droplets are not discharged with clogging caused in the discharge nozzles 501, 501, . . . , 701, 701, . . . of the inkjet print heads 5K to 5C, 7K to 7C, an image defect 201*a* in which a linear image 201 is not formed on the test chart 200 to be printed as illustrated in FIG. 4 is caused. Therefore, when the image printed on the test chart 200 is read by the inline sensors 801, 802 of the detection section 8, the control device 100 detects absence of image data at a position corresponding to the discharge nozzles 501, 501, . . . , 701, 701, . . . with a discharge defect.

Figure 5A:
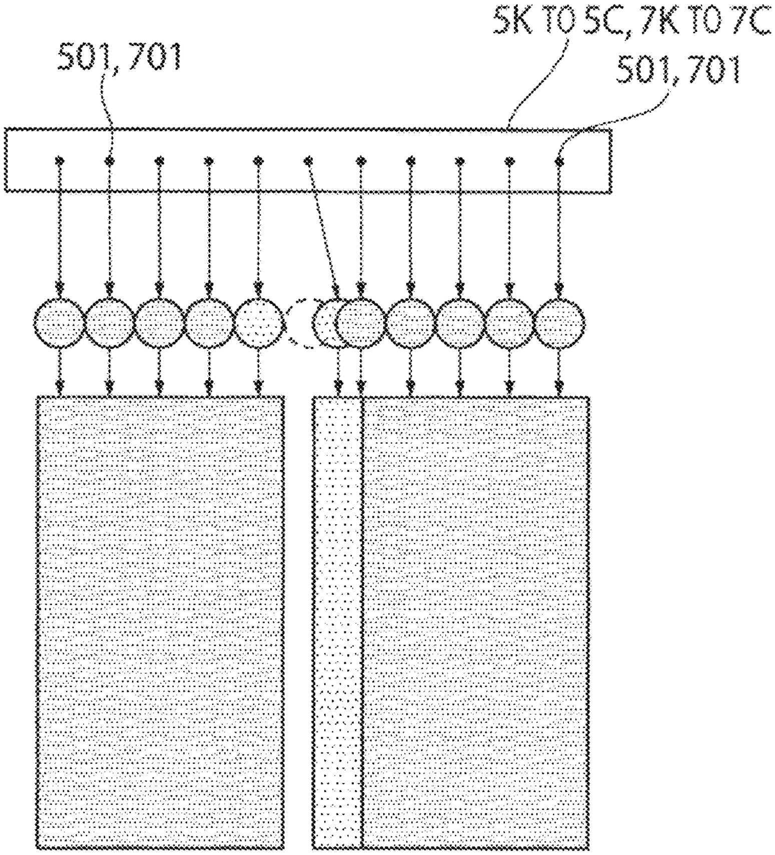
FIGS. 5A and 5B are each a diagram illustrating a state of printing by a defective nozzle.
Figure 5B:
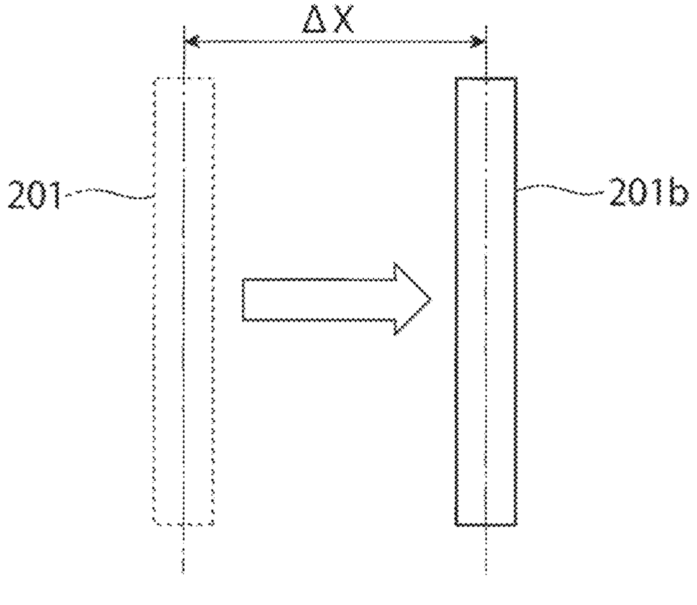

In the case where deviation of ink droplets is caused for the discharge nozzles 501, 501, . . . , 701, 701, . . . of the inkjet print heads 5K to 5C, 7K to 7C, the control device 100 detects misregistration ΔX of a linear image 201*b* on the test chart 200 to be printed as illustrated in FIGS. 4 and 5A and 5B. It is also possible to detect an abnormality in the amount of ink droplets to be discharged, by detecting the line width of the linear image 201*b* on the test chart 200.

The amount of deviation of ink droplets is obtained by detecting a displacement amount ΔX from the position of the linear image 201 that should originally be formed, by detecting the position of the linear image 201*b* formed by the ink droplets using the inline sensors 801, 802 of the detection section 8 as illustrated in FIG. 5B.

Figure 6:
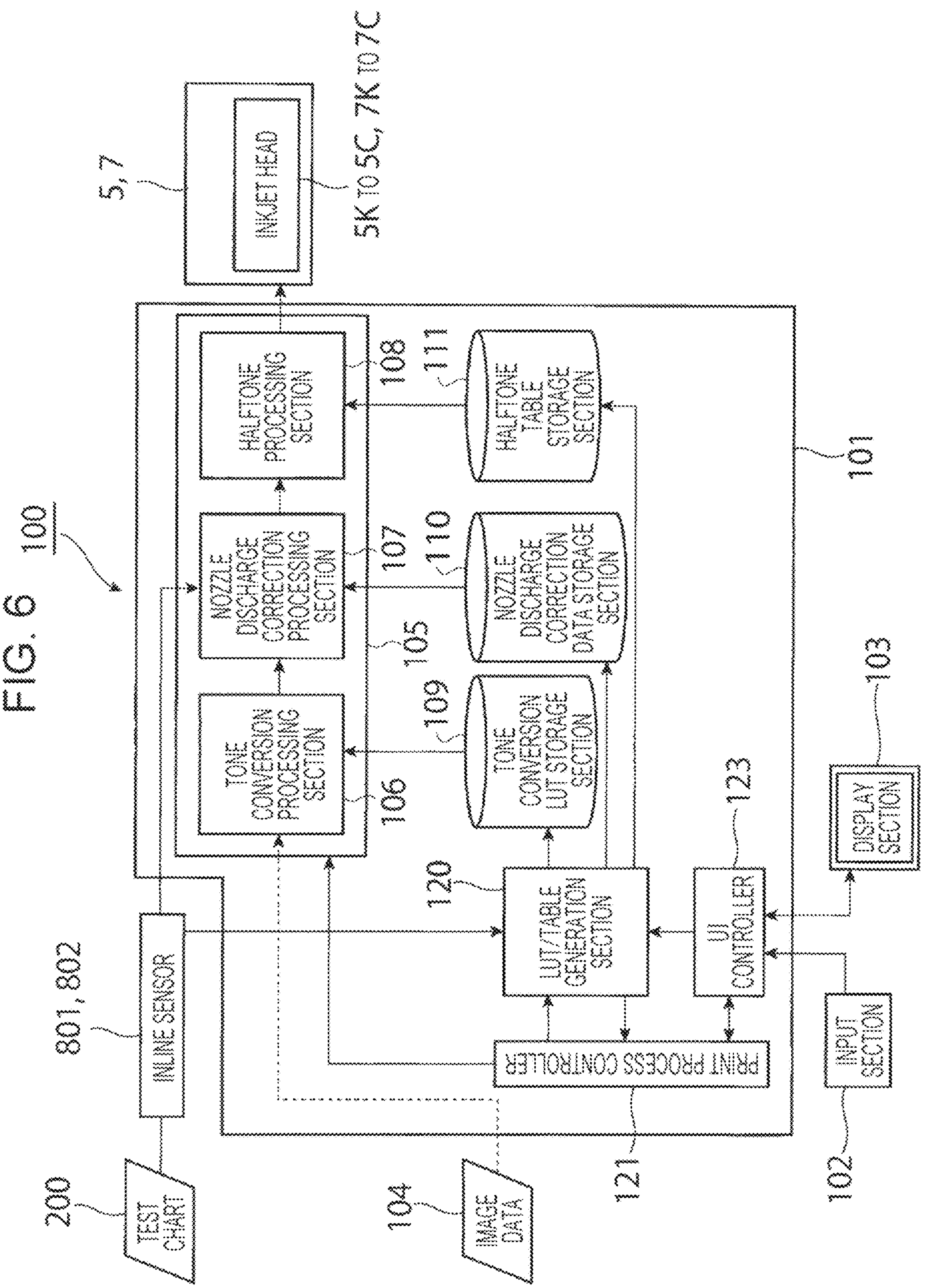
FIG. 6 is a block diagram illustrating a controller of the inkjet recording apparatus according to the first exemplary embodiment of the present disclosure.

As illustrated in FIG. 6, when occurrence of an abnormal nozzle in the discharge nozzles 501, 501, . . . , 701, 701, . . . of the inkjet print heads 5K to 5C, 7K to 7C for black (K), yellow (Y), magenta (M), and cyan (C) is detected, the inkjet recording apparatus 1 executes so-called non-discharge correction in which the abnormal nozzle is not used for image formation but the amount of ink droplets to be discharged from a discharge nozzle that is adjacent to the abnormal nozzle is corrected.

FIG. 6 is a block diagram illustrating a control device of the inkjet recording apparatus according to the first exemplary embodiment.

As illustrated in FIG. 6, the control device 100 roughly includes a controller 101, an input section 102, and a display section 103.

The controller 101 controls various kinds of operation of the inkjet recording apparatus 1. The controller 101 receives image data 104 input from an external host device such as a personal computer (not illustrated).

The input section 102 is used by the user to perform an input operation for causing the inkjet recording apparatus 1 to operate. The input section 102 is constituted from a keyboard, a mouse, a touch screen, etc. The display section 103 is constituted from a liquid crystal display panel etc. that displays information input using the input section 102, the status of operation of the inkjet recording apparatus 1, etc.

The user operates the inkjet recording apparatus 1 via the input section 102 and the display section 103. When a print instruction is input from the host device such as a personal computer (not illustrated), the image data 104 such as page data are sent to the inkjet recording apparatus 1, and processed by an image processing circuit (image process board) 105.

The inkjet recording apparatus 1 includes: the image processing circuit 105 (various processing sections 106, 107, 108) that performs signal processing for converting the image data 104 for printing input from the host device (not illustrated) into a marking signal; the first and second image forming sections 5, 7 that execute image recording by driving the inkjet print heads 5K to 5C, 7K to 7C for the different colors in accordance with the marking signal; and the inline sensors 801, 802 of the detection section 8 that read the test chart 200 etc. recorded by the first and second image forming sections 5, 7.

The image processing circuit 105 generates a marking signal by performing a tone conversion process, a nozzle discharge correction process, and a halftone process while performing various processes to generate a marking signal from the image data 104. The image processing circuit 105 includes a tone conversion processing section 106, a nozzle discharge correction processing section (droplet amount restriction unit, droplet amount correction unit) 107, and a halftone processing section 108.

The tone conversion processing section 106 performs a process for determining the properties of density gradation, that is, with what color thickness drawing is performed, when an image is recorded by the first and second image forming sections 5, 7. The tone conversion processing section 106 converts the image data 104 so as to have the color reproduction properties prescribed by the inkjet recording apparatus 1. Specifically, the tone conversion processing section 106 converts the image data 104 into an image signal corresponding to each of the colors of black (K), yellow (Y), magenta (M), and cyan (C) in accordance with color information, tone, etc. of the image to be recorded by the inkjet recording apparatus 1.

The conversion relationship of the signal conversion by the tone conversion processing section 106 is determined with reference to a tone conversion look-up table (LUT) (not illustrated) stored in a tone conversion LUT storage section 109. The tone conversion LUT storage section 109 stores a plurality of LUTs optimized for types of recording media (paper to be used), and an appropriate LUT is referenced in accordance with the recording medium. Such a tone conversion LUT is prepared for each of the ink colors. In the case of the present example, a tone conversion LUT is provided for each of black (K), yellow (Y), magenta (M), and cyan (C).

When a print execution instruction is input, a tone conversion LUT that matches the printing condition is automatically selected, and set to the tone conversion processing section 106. It is also possible to set a desired LUT by inputting an instruction to select, change, correct, etc. an LUT using the input section 102.

The nozzle discharge correction processing section 107 executes non-discharge correction in the case where an abnormal nozzle is caused from the discharge nozzles 501, 501, . . . , 701, 701, . . . of the inkjet print heads 5K to 5C, 7K to 7C on the basis of the result of detection of the test chart 200. In the non-discharge correction, use of the abnormal nozzle is disabled, and the amount of ink droplets from a discharge nozzle that is adjacent to the abnormal nozzle is corrected.

The nozzle discharge correction processing section 107 converts etc. the image signal in order to correct the output density (droplet amount of ink to be discharged) of the abnormal nozzle (deviation nozzle) and, in particular, the output density (droplet amount of ink to be discharged) of an adjacent nozzle that is adjacent to the abnormal nozzle, among the plurality of discharge nozzles 501, 501, . . . , 701, 701, . . . of the inkjet print heads 5K to 5C, 7K to 7C. Correcting the output density is correcting the droplet amount of ink to form each dot of an image, and is implemented by correcting the dot diameter of ink or correcting the average droplet amount of ink to be discharged from the nozzles, for example.

The "adjacent nozzle" is not limited to a nozzle that is adjacent to the abnormal nozzle, and also includes a nozzle that records pixels that are adjacent to pixels corresponding to the abnormal nozzle, that is, a nozzle that is not necessarily adjacent to the abnormal nozzle. When the output density of the adjacent nozzle is corrected, the output density of a nozzle positioned on the outer side of the adjacent nozzle (opposite side of the abnormal nozzle) may be corrected at the same time as necessary.

Figure 7A:
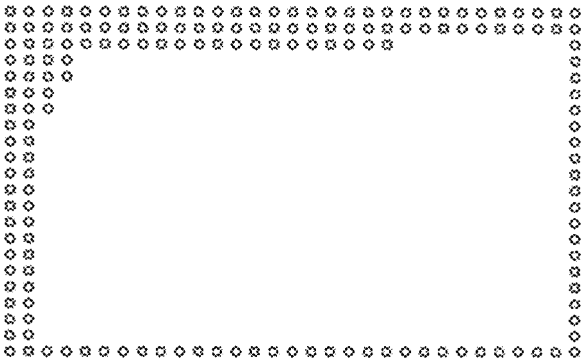
FIGS. 7A and 7B are each a schematic view illustrating a screen that is used to form an image.
Figure 7B:
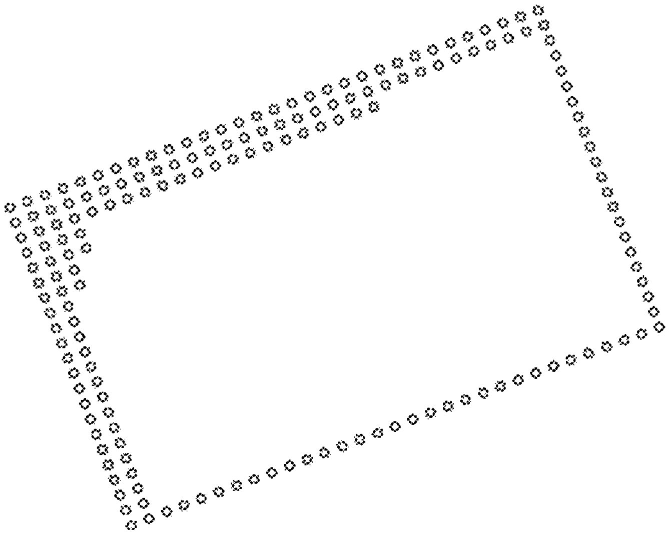

The halftone processing section 108 converts the image signal with multiple tones (e.g. 8 bits, 256 tones per color) into a binary signal that indicates whether or not to discharge ink, or a multilevel signal that indicates ink of what droplet type to discharge in the case where a plurality of ink diameters (droplet sizes, dot sizes) are selectable, for each pixel. In general, the halftone processing section 108 performs a process of converting image data with multiple tones of M values (M is an integer of 3 or more) into data with N values (N is an integer of 2 or more and less than M). The halftone process may use dithering, an error diffusion technique, a density pattern method, etc. Screens such as those illustrated in FIGS. 7A and 7B, for example, are used in the halftone process.

For example, in the case where the inkjet print heads 5K to 5C, 7K to 7C are capable of hitting droplets of three sizes of large droplets, medium droplets, and small droplets, the halftone processing section 108 converts the data with multiple tones (e.g. 256 tones) after the nozzle discharge correction process into a signal with four values of "discharge ink in large droplets", "discharge ink in medium droplets", "discharge ink in small droplets", and "discharge no ink". The conversion relationship of the signal conversion by the halftone processing section 108 is determined with reference to a halftone table (not illustrated) stored in a halftone table storage section 111.

A study conducted by the present inventor has revealed that the following trouble is caused in the case where the inkjet recording apparatus 1 configured as described above is configured such that, when a discharge defect is detected for any of the discharge nozzles 501, 501, . . . , 701, 701, . . . of the inkjet print heads 5K to 5C, 7K to 7C, the relevant discharge nozzle is always disabled.

Figure 8A:
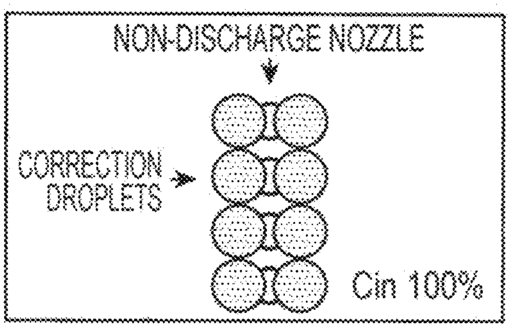
FIGS. 8A to 8C are each a diagram illustrating non-discharge correction for the defective nozzle.
Figure 8B:
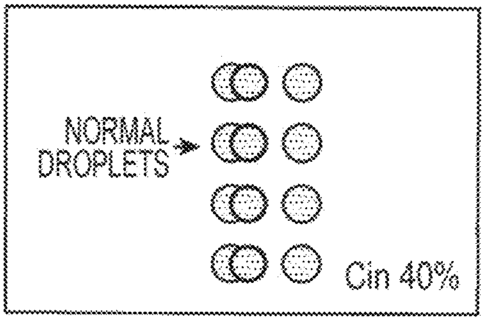
Figure 8C:
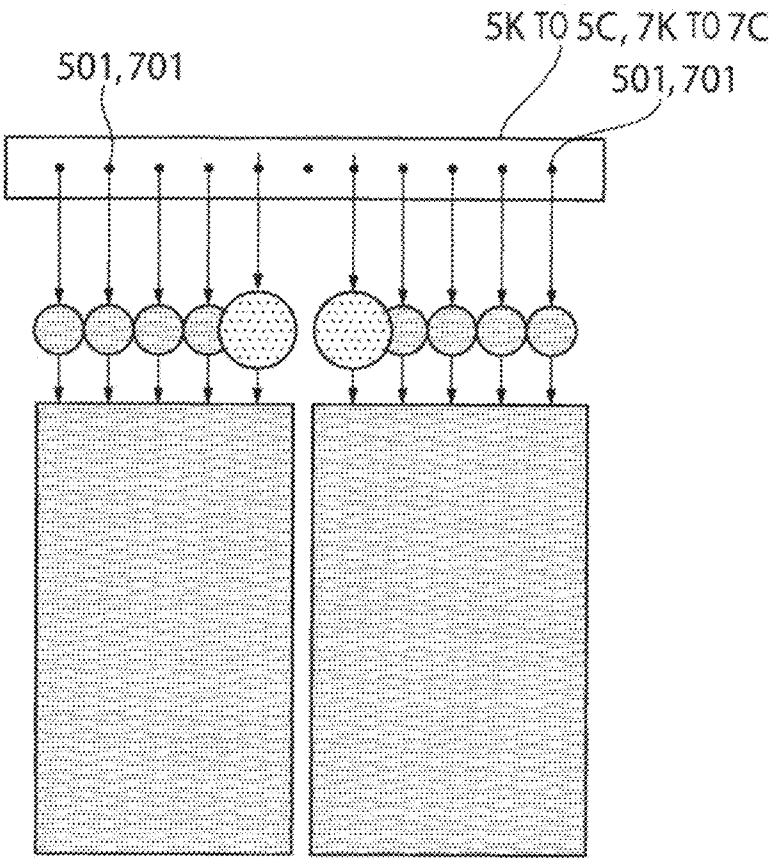
Figure 9A:
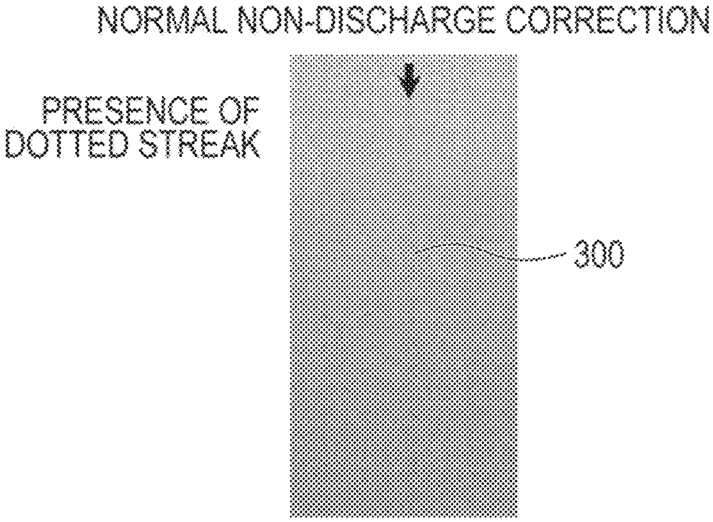
FIGS. 9A and 9B illustrate the presence or absence of an image quality defect caused by non-discharge correction.

In the case where a discharge defect has been caused in any of the discharge nozzles 501, 501, . . . , 701, 701, . . . of the inkjet print heads 5K to 5C, 7K to 7C in the inkjet recording apparatus 1, non-discharge correction in which the discharge nozzle with the discharge defect is not used and the amount of ink droplets from adjacent discharge nozzles is corrected is performed as illustrated in FIGS. 8A and 8B. Then, it is possible to suppress occurrence of a white streak due to the non-discharge nozzle as illustrated in FIG. 8C. On the other hand, the image formed by the nozzles subjected to the non-discharge correction interferes with the screen used by the halftone processing section 108 that forms the image to cause a new image quality defect 300 constituted of a broken streaked image due to linear random variations in density at a position corresponding to the non-discharge nozzle as illustrated in FIG. 9A.

A study conducted by the present inventor has also revealed that the grade of the new image quality defect 300, which is constituted of a broken streaked image due to linear random variations in density, is varied in accordance with tone Cin of the image information and different in accordance with the amount of deviation of ink droplets and the ink color.

Figure 10:
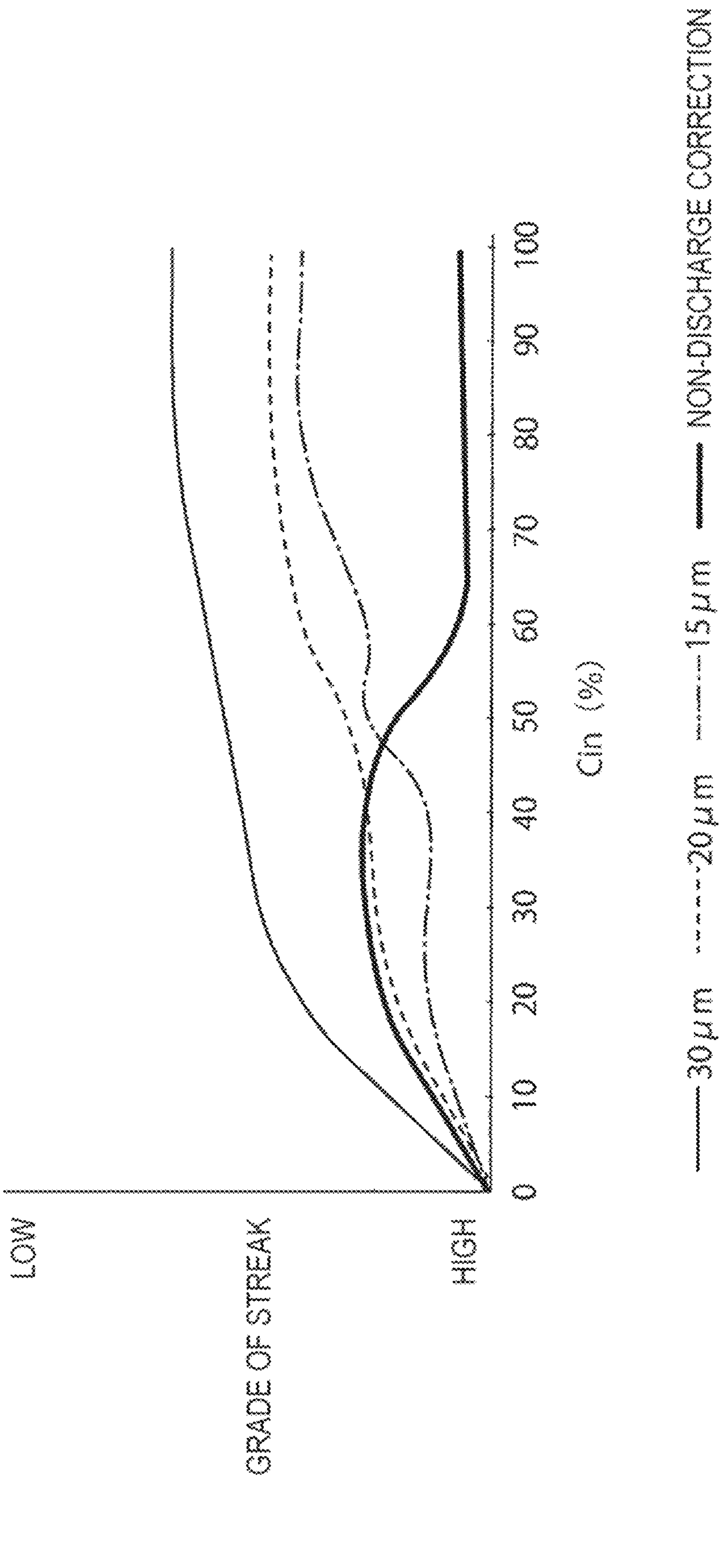
FIG. 10 is a graph illustrating the relationship between Cin and the grade of streak-shaped image quality defects.

FIG. 10 indicates the result of an experiment conducted to obtain how the grade of an image quality defect is varied in accordance with the amount of deviation of ink droplets for the inkjet print heads 5M, 7M for magenta, the horizontal axis representing the tone Cin of the image information and the vertical axis representing a grade G of a new image quality defect constituted of a broken streaked image. Grades for image quality evaluation that are internally used in Fujifilm Business Innovation Corp. are used the grade G of a new image quality defect constituted of a broken streaked image.

As is clear from FIG. 10, the grade G of the image quality defect 300 tends to become lower as the tone Cin of the image information becomes higher as a whole. However, it is also seen that the grade G of the image quality defect 300 is improved by performing non-discharge correction when the tone Cin of the image information is more than 40 to 50%, but that the grade G of the image quality defect is higher when the nozzle with the discharge defect is used as it is for image formation, without being subjected to non-discharge correction, when the amount of deviation of ink droplets is 20 μm or less in the case where the tone Cin of the image information is 40 to 50% or less.

Figure 11:
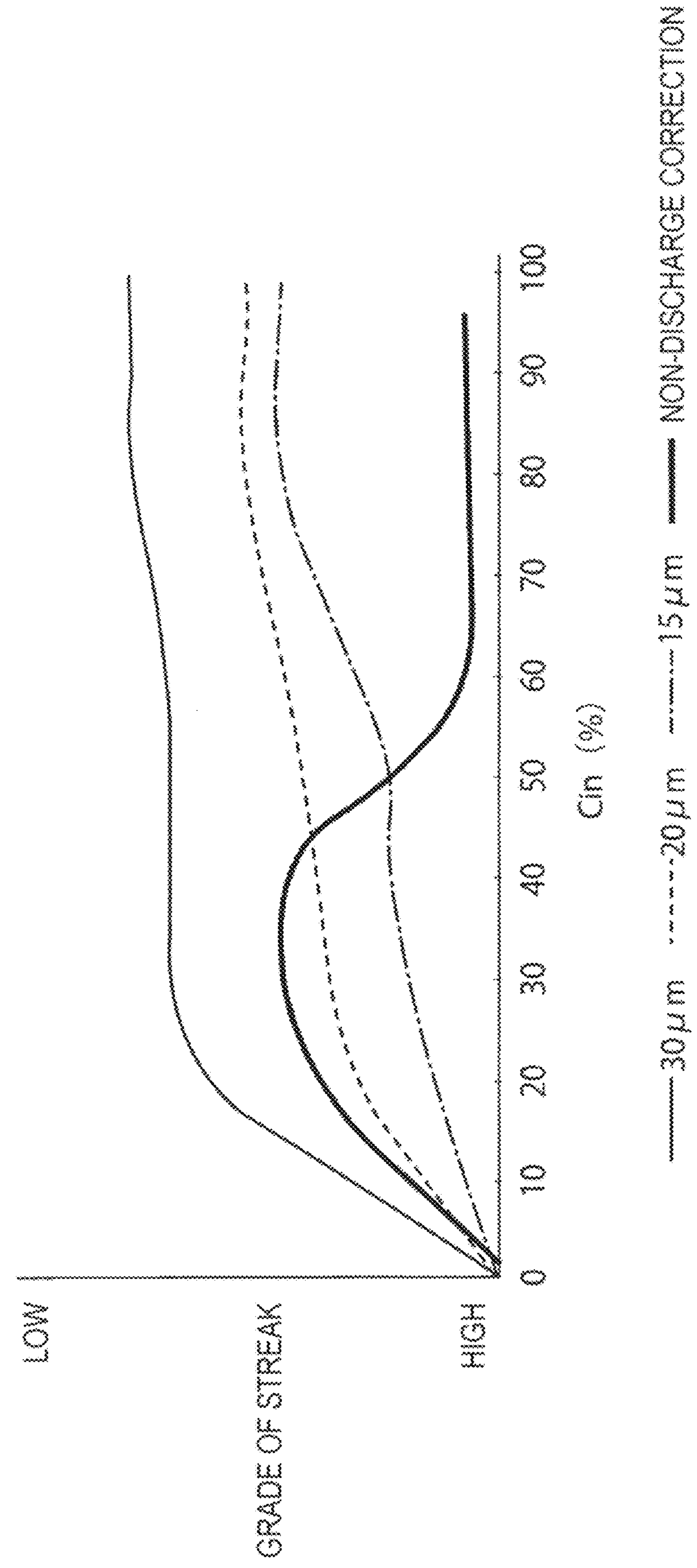
FIG. 11 is a graph illustrating the relationship between Cin and the grade of streak-shaped image quality defects.

FIG. 11 is a graph for the inkjet print heads 5K, 7K for black, the horizontal axis representing the grade Cin of the image information and the vertical axis representing the grade G of a new image quality defect constituted of a broken streaked image.

As is clear from FIG. 11, the grade G of an image quality defect is low also in a region in which the tone Cin of the image information is low at 20 to 30% as a whole compared to magenta, and the grade G of an image quality defect tends to become lower as the tone Cin of the image information becomes higher. In addition, it is also seen that the grade G of the image quality defect is improved by performing non-discharge correction when the tone Cin of the image information is more than 40 to 50%, but that the grade of the image quality defect is higher when the nozzle with the discharge defect is used as it is for image formation, without being subjected to non-discharge correction, when the amount of deviation of ink droplets is 20 μm or less in the case where the tone Cin of the image information is 40 to 50% or less.

Thus, the inkjet recording apparatus 1 according to the first exemplary embodiment is configured to include a change unit that changes whether the non-discharge nozzle is disabled by a non-discharge unit in accordance with the tone of the image information, in order to suppress occurrence of an image quality defect 300 in the form of a broken line which would be newly generated in the case where non-discharge correction were performed uniformly.

That is, in the inkjet recording apparatus 1 according to the first exemplary embodiment, as illustrated in FIG. 6, a detection signal from the inline sensors 801, 802 is input to a print process controller 121 as an example of the change unit, either via an LUT/table generation section 120 of the controller 101 or directly.

The print process controller 121 is configured to calculate an error in the position hit by ink droplets from the discharge nozzles 501, 501, . . . , 701, 701, . . . of the inkjet print heads 5K to 5C, 7K to 7C for black (K), yellow (Y), magenta (M), and cyan (C) on the basis of the detection signal from the inline sensors 801, 802, and change whether or not the nozzle discharge correction processing section 107 disables the defective nozzle on the basis of the error in the position hit by ink droplets from the discharge nozzles 501, 501, . . . , 701, 701, . . . . The phrase "error in the position hit by ink droplets" as used herein refers to the difference between the position that should be hit by droplets from the nozzle and the position actually hit by such droplets.

For further description, the print process controller 121 is configured to determine whether or not an error in the position hit by ink droplets from the discharge nozzles 501, 501, . . . , 701, 701, . . . of the inkjet print heads 5K to 5C, 7K to 7C for black (K), yellow (Y), magenta (M), and cyan (C) is a first threshold (e.g. 15 μm) or less, and not to cause the nozzle discharge correction processing section 107 to disable the defective nozzle when it is determined that the error is the first threshold or less.

In addition, the print process controller 121 switches to or not to execute non-discharge correction in accordance with the tone value Cin of the image data 104 in the case where an error in the position hit by ink droplets from the discharge nozzles 501, 501, . . . , 701, 701, . . . of the inkjet print heads 5K to 5C, 7K to 7C for black (K), yellow (Y), magenta (M), and cyan (C) is more than the first threshold (e.g. 15 μm) and a second threshold (e.g. 20 μm) or less on the basis of the detection signal from the inline sensors 801, 802.

The print process controller 121 is configured not to execute non-discharge correction in the case where the tone value Cin of the image data 104 is a threshold (e.g. 45%) or less but to execute non-discharge correction in the case where the tone value Cin of the image data 104 is more than the threshold (e.g. 45%) when it is determined that an error in the position hit by ink droplets from the discharge nozzles 501, 501, . . . , 701, 701, . . . is more than the first threshold (e.g. 15 μm) and the second threshold (e.g. 20 μm) or less.

Further, the print process controller 121 is configured to always execute non-discharge correction for all tones (0 to 100%) when an error in the position hit by ink droplets from the discharge nozzles 501, 501, . . . , 701, 701, . . . of the inkjet print heads 5K to 5C, 7K to 7C for black (K), yellow (Y), magenta (M), and cyan (C) is more than the second threshold (e.g. 20 μm) on the basis of the detection signal from the inline sensors 801, 802.

<Operation of Inkjet Recording Apparatus>

The inkjet recording apparatus according to the first exemplary embodiment suppresses a reduction in image quality compared to the case where non-discharge correction is always performed when there occurs a defective nozzle that is not suitably used to record an image, as follows.

Figure 12:
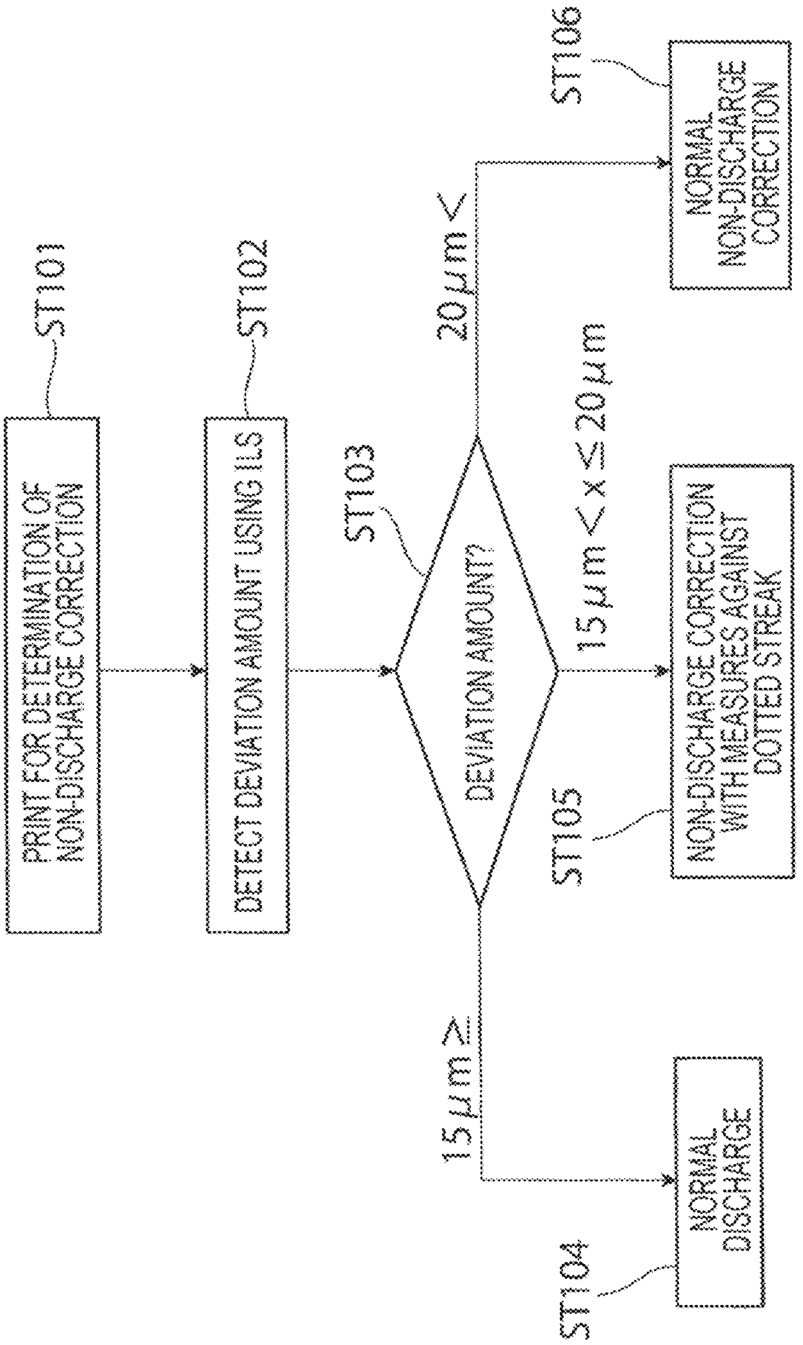
FIG. 12 is a flowchart illustrating operation of the inkjet recording apparatus according to the first exemplary embodiment of the present disclosure.

That is, in the inkjet recording apparatus 1 according to the first exemplary embodiment, as illustrated in FIG. 12, a test chart 200 for detecting a discharge defect of the inkjet print heads 5K to 5C, 7K to 7C for black (K), yellow (Y), magenta (M), and cyan (C) is output (FIG. 3) at a prescribed timing such as each time the paper feed roller 3 mounted to the paper feed section 4 is replaced with a new one, and an image of the test chart 200 is detected by the inline sensors 801, 802 of the detection section 8 (step 101).

Then, in the control device 100 of the inkjet recording apparatus 1, as illustrated in FIG. 6, the nozzle discharge correction processing section 107 detects (calculates) an error (amount of deviation) in the discharge direction of ink droplets from the discharge nozzles 501, 501, . . . , 701, 701, . . . of the inkjet print heads 5K to 5C, 7K to 7C on the basis of detection data on the test chart 200 from the inline sensors 801, 802 of the detection section 8 (step 102), and determines the error (amount of deviation) in the discharge direction of the ink droplets (step 103).

When it is determined that the error in the position hit by the ink droplets from the discharge nozzles 501, 501, . . . , 701, 701, . . . of the inkjet print heads 5K to 5C, 7K to 7C for black (K), yellow (Y), magenta (M), and cyan (C) is a first threshold (e.g. 15 μm) or less, the print process controller 121 of the control device 100 maintains the normal discharge state without executing non-discharge correction.

When it is determined that the error in the position hit by the ink droplets from the discharge nozzles 501, 501, . . . , 701, 701, . . . of the inkjet print heads 5K to 5C, 7K to 7C for black (K), yellow (Y), magenta (M), and cyan (C) is more than the first threshold (e.g. 15 μm) and the second threshold (e.g. 20 μm) or less, meanwhile, the print process controller 121 does not execute non-discharge correction when the tone value Cin of the image data 104 is a threshold (e.g. 45%) or less, and executes non-discharge correction when the tone value Cin of the image data 104 is more than the threshold (e.g. 45%) (step 105).

Figure 9B:
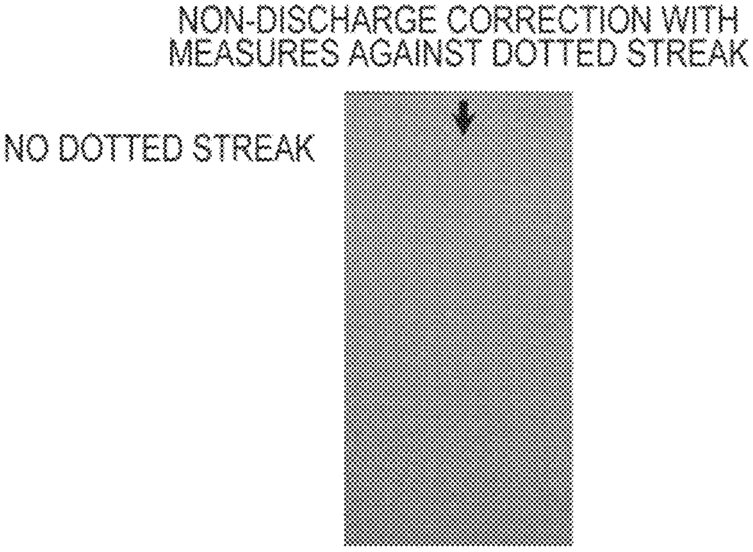

In this manner, in the case where it is determined that the error in the position hit by the ink droplets from the discharge nozzles 501, 501, . . . , 701, 701, . . . is more than the first threshold (e.g. 15 μm) and the second threshold (e.g. 20 μm) or less, non-discharge correction is not executed when the tone value Cin of the image data 104 is the threshold (e.g. 45%) or less, which suppresses occurrence of an image quality defect 300 in the form of a broken line due to execution of non-discharge correction as illustrated in FIG. 9B.

When it is determined that the error in the position hit by the ink droplets from the discharge nozzles 501, 501, . . . , 701, 701, . . . of the inkjet print heads 5K to 5C, 7K to 7C for black (K), yellow (Y), magenta (M), and cyan (C) is more than the second threshold (e.g. 20 μm), the print process controller 121 always executes normal non-discharge correction, irrespective of the tone value Cin of the image data 104 (step 106).

Second Exemplary Embodiment

Figure 13:
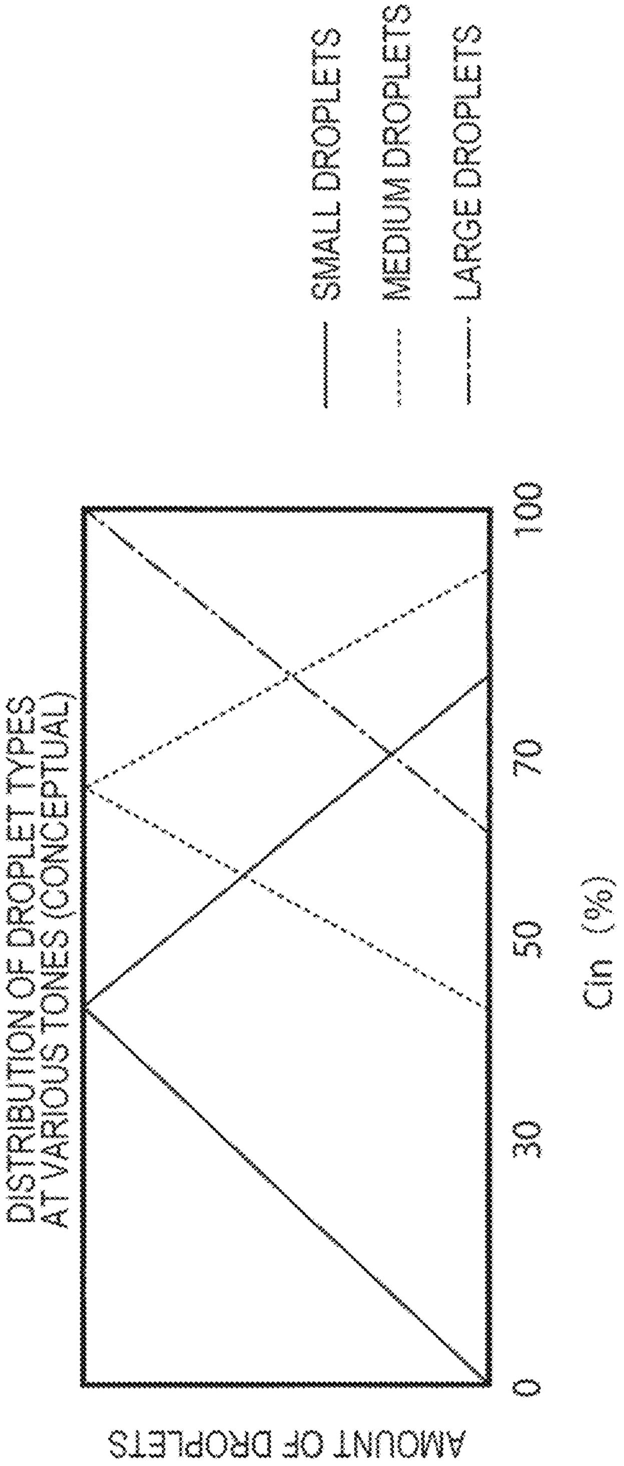
FIG. 13 is a graph illustrating the relationship between Cin and the amount of hitting droplets.

FIG. 13 is a diagram illustrating an overview of the entire inkjet recording apparatus according to a second exemplary embodiment of the present disclosure.

That is, as illustrated in FIG. 13, in the case where the inkjet print heads 5K to 5C, 7K to 7C are capable of hitting droplets of three sizes of large droplets, medium droplets, and small droplets, for example, the halftone processing section 108 of the control device of the inkjet recording apparatus 1 according to the second exemplary embodiment converts the data with multiple tones (e.g. 256 tones) after the nozzle discharge correction process into a signal with four values of "discharge ink in small droplets" when the tone value Cin is 0 to 30%, "discharge ink in small droplets+medium droplets" when the tone value Cin is 30 to 50%, "discharge ink in small droplets+medium droplets+large droplets" when the tone value Cin is 50 to 70%, and "discharge ink in large droplets" when the tone value Cin is 70 to 100%. The conversion relationship of the signal conversion by the halftone processing section 108 is determined with reference to a halftone table (not illustrated) stored in the halftone table storage section 111.

The control device 100 of the inkjet recording apparatus 1 according to the second exemplary embodiment records a test chart 400 at a uniform density with four intermediate tones with tone values Cin of 0 to 30%, 30 to 50%, 50 to 70%, and 70 to 100% on the continuous feed paper 2, and reads an image of the test chart 400 recorded on the continuous feed paper 2 as brightness information using the inline sensors 801, 802 of the detection section 8.

The control device 100 detects brightness information using the inline sensors 801, 802 of the detection section 8, and determines from the brightness information whether or not the degree of occurrence of a white streak is more than a threshold determined in advance.

The control device 100 is configured to execute non-discharge correction for image data for which the degree of occurrence of a white streak is more than the threshold determined in advance and in which a strong white streak is caused, and not to execute non-discharge correction for image data for which the degree of occurrence of a white streak is the threshold or less.

In this manner, the control device 100 automatically executes non-discharge correction by switching to or not to execute non-discharge correction on the basis of the brightness information on the test chart 400.

The configuration and the function are otherwise similar to those of the first exemplary embodiment described earlier. Thus, such similarities are not described.

Third Exemplary Embodiment

Figure 14:
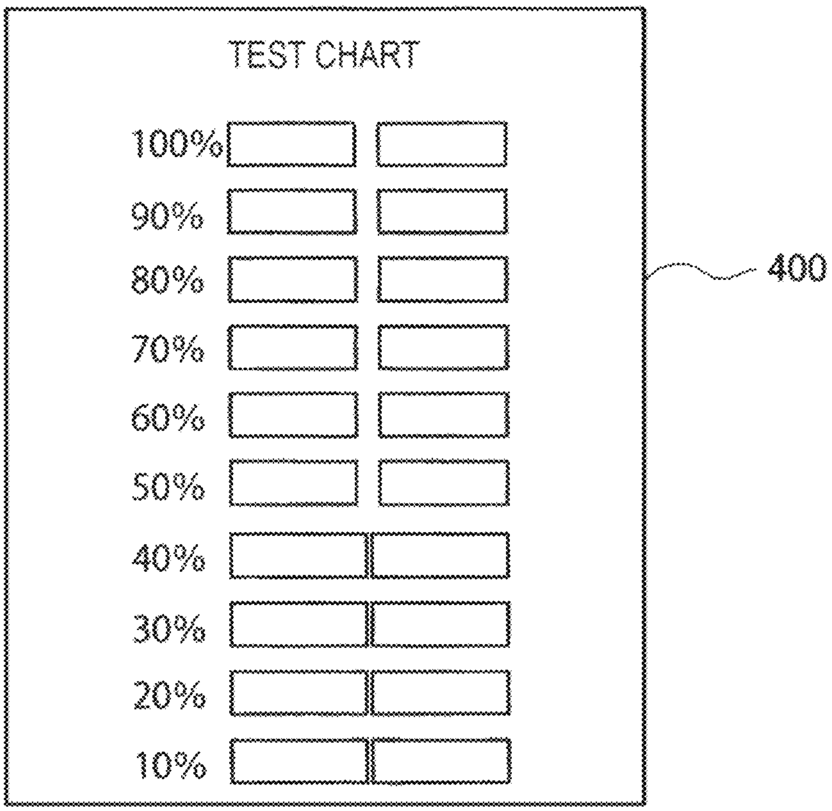
FIG. 14 schematically illustrates a test chart output from an inkjet recording apparatus according to a third exemplary embodiment of the present disclosure.

FIG. 14 schematically illustrates a test chart output from an inkjet recording apparatus according to a third exemplary embodiment of the present disclosure.

That is, as illustrated in FIG. 14, the inkjet recording apparatus 1 according to the third exemplary embodiment is configured to output a test chart at ten different tones with tone values Cin of 10%, 20%, 30%, 40%, 50%, 60%, 70%, 80%, 90%, and 100%, for example, and allow a user to visually observe the output test chart, to execute non-discharge correction at tones at which it is determined that a white streak is striking, and not to execute non-discharge correction at tones at which it is determined that a white streak is not striking.

The user visually observes the test chart, and operates the input section 102 to input the range of tone in which non-discharge correction is to be executed. The range of tone in which non-discharge correction is to be executed, which has been input by the user by operating the input section 102, may be displayed on the display section 103 to be confirmed.

The configuration and the operation are otherwise similar to those of the exemplary embodiments described earlier. Thus, such similarities are not described.

Fourth Exemplary Embodiment

Figure 15:
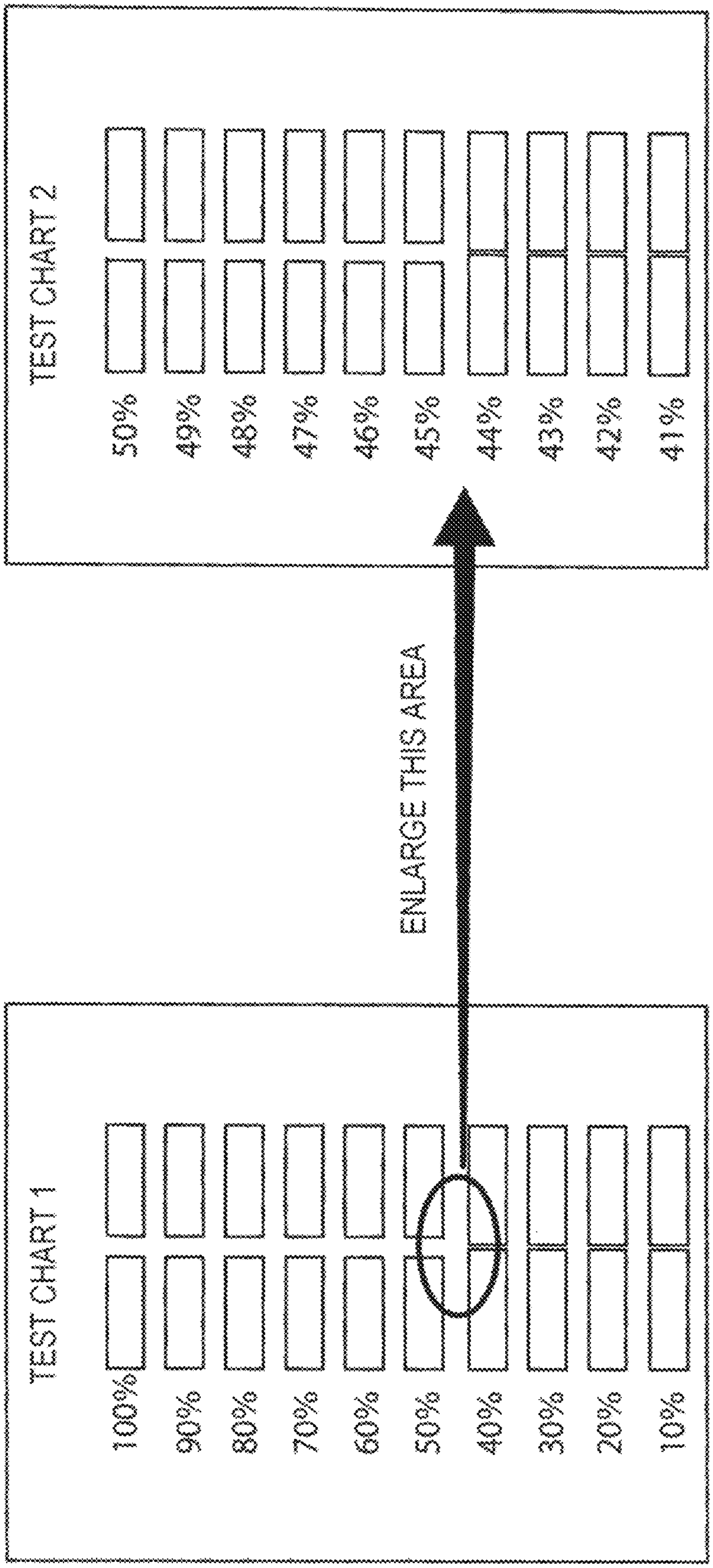
FIG. 15 schematically illustrates a test chart output from an inkjet recording apparatus according to a fourth exemplary embodiment of the present disclosure.

FIG. 15 schematically illustrates a test chart output from an inkjet recording apparatus according to a fourth exemplary embodiment of the present disclosure.

That is, as illustrated in FIG. 15, the inkjet recording apparatus 1 according to the fourth exemplary embodiment is configured to output, as a test chart, a second test chart, in which the tone value Cin is varied more finely by 1%, for example, between a tone value Cin of 40% and a tone value Cin of 50% when the user desires to know how the degree of strikingness of a white streak is varied in the case where the tone value Cin is varied more finely between a tone value Cin of 40% and a tone value Cin of 50%, when the degree of strikingness of a white streak is varied between a tone value Cin of 40% and a tone value Cin of 50%, for example, through visual observation of the output result of the first test chart, in addition to the test chart according to the third exemplary embodiment, to allow the user to visually observe the second test chart and input the range of tone in which non-discharge correction is to be executed, that is, Cin of 45% or more in the illustrated example, by operating the input section 102.

The configuration and the operation are otherwise similar to those of the exemplary embodiments described earlier. Thus, such similarities are not described.

Fifth Exemplary Embodiment

In the inkjet recording apparatus 1 according to a fifth exemplary embodiment of the present disclosure, the control device 100 is configured not to execute non-discharge correction uniformly for the defective nozzle in a normal discharge state when the tone value Cin is less than 40%, but to execute non-discharge correction in the case where the tone value Cin is 40% or more, unlike the third exemplary embodiment or the fourth exemplary embodiment discussed above in which a test chart is output to allow the user to determine (set) the tone value (range) at which non-discharge correction is to be executed.

In the description of the fifth exemplary embodiment, non-discharge correction is executed on the assumption that a defective nozzle is present among the inkjet print heads 5K to 5C, 7K to 7C. As a matter of course, however, non-discharge correction may not be executed in the case where no defective nozzle is present among the inkjet print heads 5K to 5C, 7K to 7C.

The configuration and the operation are otherwise similar to those of the exemplary embodiments described earlier. Thus, such similarities are not described.

Sixth Exemplary Embodiment

Figure 16:
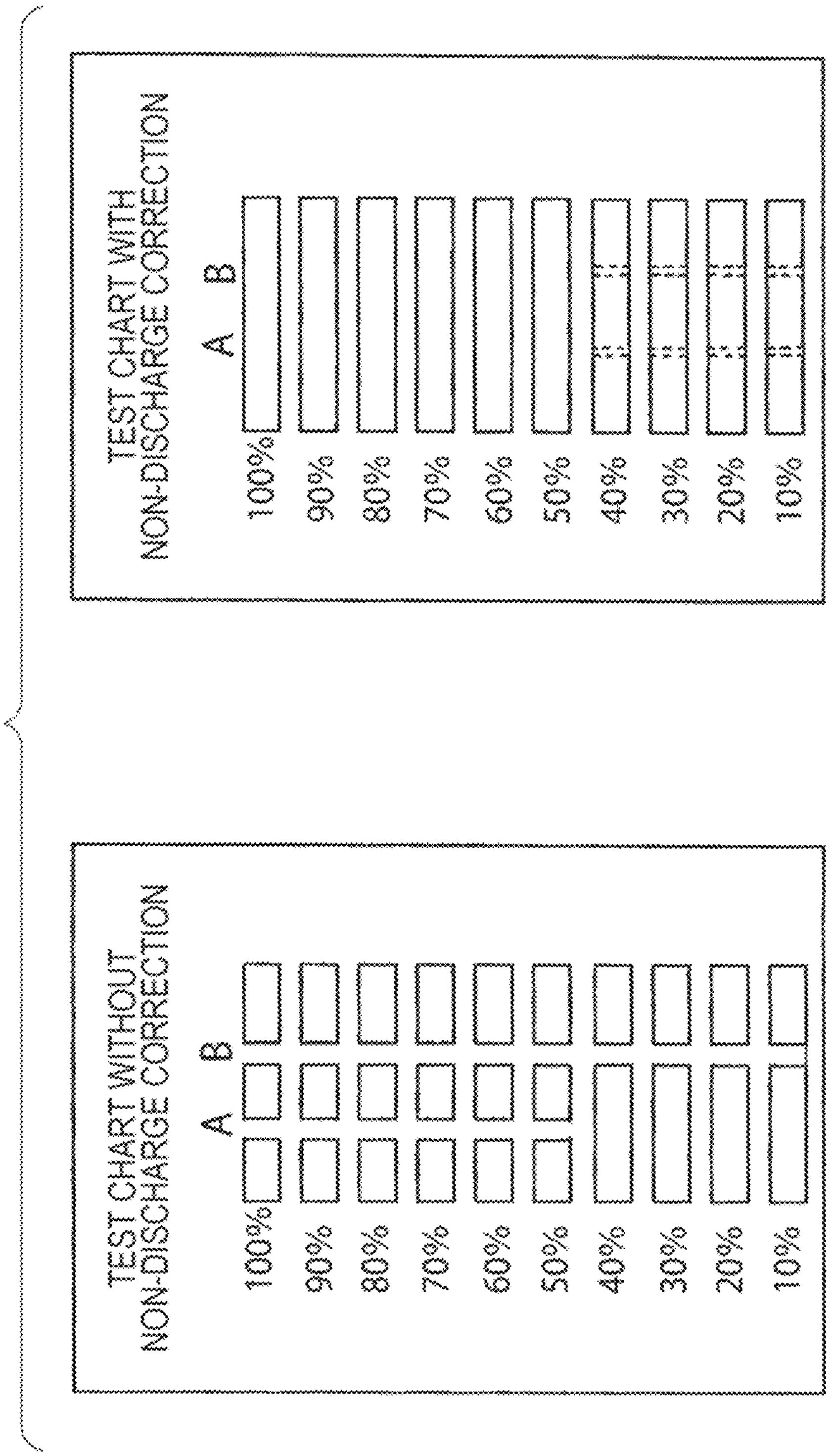
FIG. 16 schematically illustrates a test chart output from an inkjet recording apparatus according to a sixth exemplary embodiment of the present disclosure.

FIG. 16 schematically illustrates a test chart output from an inkjet recording apparatus according to a sixth exemplary embodiment of the present disclosure.

That is, as illustrated in FIG. 16, the inkjet recording apparatus 1 according to the sixth exemplary embodiment outputs a third test chart with execution of non-discharge correction and a fourth test chart without execution of non-discharge correction for all tone values, such as ten tone values Cin of 10%, 20%, 30%, 40%, 50%, 60%, 70%, 80%, 90%, and 100%, for example, for a defective nozzle from the inkjet print heads 5K to 5C, 7K to 7C.

In the sixth exemplary embodiment, as illustrated in FIG. 16, when a focus is placed on a defective nozzle A, it is seen that a strong white streak is caused in a region in which the tone value Cin is 50% or more and a strong white streak is not caused in a region in which the tone value Cin is less than 50% in the case where non-discharge correction is not executed, but that an image quality defect in the form of a broken line is caused in a region in which the tone value Cin is less than 50% in the case where non-discharge correction is executed.

Thus, the user operates the input section 102 to execute non-discharge correction in a region in which the tone value Cin is 50% or more, and not to execute non-discharge correction in a region in which the tone value Cin is less than 50%, for the defective nozzle A from the inkjet print heads 5K to 5C, 7K to 7C.

On the other hand, in the sixth exemplary embodiment, as illustrated in FIG. 16, in the case where a focus is placed on a discharge nozzle B, it is seen that a strong white streak is caused in a region for all tone values in the case where non-discharge correction is not executed, but that a strong white streak is not caused in a region in which the tone value Cin is 50% or more and an image quality defect in the form of a broken line is caused in a region in which the tone value Cin is less than 50% in the case where non-discharge correction is executed.

In this case, the user determines that the image quality is better when an image quality defect in the form of a broken line is caused than when a strong white streak is caused, and is able to make settings to execute non-discharge correction in a region for all tone values.

The configuration and the operation are otherwise similar to those of the exemplary embodiments described earlier. Thus, such similarities are not described.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An inkjet recording apparatus comprising:

a plurality of nozzles that discharge ink droplets in accordance with image information to record an image on a recording medium;

a detection unit that detects a defective nozzle from the plurality of nozzles;

a non-discharge correction unit that performs non-discharge correction in which the defective nozzle detected by the detection unit is disabled from discharge and an amount of ink droplets from a nozzle that is adjacent to the defective nozzle is corrected; and a change unit that changes whether or not the non-discharge correction unit performs the non-discharge correction in accordance with a tone of the image information.

(((2)))

The inkjet recording apparatus according to (((1))), wherein the change unit makes a change such that the non-discharge correction is not performed in a case where the tone of the image information is equal to or less than a predetermined threshold.

(((3)))

The inkjet recording apparatus according to (((1))), wherein the detection unit detects a position hit by the ink droplets discharged from the plurality of nozzles, and the change unit does not cause the non-discharge correction unit to execute the non-discharge correction in a case where an error in the position hit by the ink droplets discharged from the nozzle detected by the detection unit is a first threshold or less.

(((4)))

The inkjet recording apparatus according to (((2))), wherein the detection unit detects a position hit by the ink droplets discharged from the plurality of nozzles, and the predetermined threshold at which the change is made such that the non-discharge correction is not performed is rendered smaller as an error in the position hit by the ink droplets is larger.

(((5)))

The inkjet recording apparatus according to any one of (((1))) to (((4))), wherein the detection unit detects brightness information on the image recorded using the ink droplets discharged from the plurality of nozzles, and a nozzle to be subjected to the non-discharge correction by the non-discharge correction unit is detected in accordance with the brightness information on the image detected by the detection unit.

(((6)))

The inkjet recording apparatus according to any one of (((1))) to (((5))), wherein the change unit changes the tone, at which the non-discharge correction unit performs the non-discharge correction for the defective nozzle, in accordance with an operation by a user.

(((7)))

The inkjet recording apparatus according to any one of (((1))) to (((6))), wherein the change unit does not cause the non-discharge correction unit to execute the non-discharge correction for the defective nozzle in a case where the tone of the image information is less than a third threshold.

(((8)))

The inkjet recording apparatus according to (((1))), wherein the change unit outputs a first test image with execution of the non-discharge correction for the defective nozzle by the non-discharge correction unit and a second test image without execution of the non-discharge correction, to allow a user to see the first and second test images and make a change as to whether or not the non-discharge correction unit performs the non-discharge correction for the defective nozzle.

(((9)))

An inkjet recording method comprising:

detecting a defective nozzle from a plurality of nozzles that discharge ink droplets in accordance with image information to record an image on a recording medium;

disabling the detected defective nozzle from discharge and correcting an amount of ink droplets from a nozzle that is adjacent to the nozzle disabled from discharge; and changing whether or not the nozzle is disabled from discharge in accordance with a tone of the image information.

What is claimed is:

1. An inkjet recording apparatus comprising:

a plurality of nozzles that discharge ink droplets in accordance with image information to record an image on a recording medium;

a detection unit that detects a defective nozzle from the plurality of nozzles;

a non-discharge correction unit that performs non-discharge correction in which the defective nozzle detected by the detection unit is disabled from discharge and an amount of ink droplets from a nozzle that is adjacent to the defective nozzle is corrected; and a change unit that binarily changes whether or not the non-discharge correction unit performs the non-discharge correction in accordance with a tone of the image information.

2. The inkjet recording apparatus according to claim 1, wherein the change unit makes the binary change such that the non-discharge correction is not performed in a case where the tone of the image information is equal to or less than a predetermined threshold.

3. The inkjet recording apparatus according to claim 2, wherein the detection unit detects a position hit by the ink droplets discharged from the plurality of nozzles, and the predetermined threshold at which the binary change is made such that the non-discharge correction is not performed is rendered smaller as an error in the position hit by the ink droplets is larger.

4. The inkjet recording apparatus according to claim 3, wherein the detection unit detects brightness information on the image recorded using the ink droplets discharged from the plurality of nozzles, and a nozzle to be subjected to the non-discharge correction by the non-discharge correction unit is detected in accordance with the brightness information on the image detected by the detection unit.

5. The inkjet recording apparatus according to claim 3, wherein the change unit does not cause the non-discharge correction unit to execute the non-discharge correction for the defective nozzle in a case where the tone of the image information is less than a third threshold.

6. The inkjet recording apparatus according to claim 2, wherein the detection unit detects brightness information on the image recorded using the ink droplets discharged from the plurality of nozzles, and a nozzle to be subjected to the non-discharge correction by the non-discharge correction unit is detected in accordance with the brightness information on the image detected by the detection unit.

7. The inkjet recording apparatus according to claim 1, wherein the detection unit detects a position hit by the ink droplets discharged from the plurality of nozzles, and the change unit does not cause the non-discharge correction unit to execute the non-discharge correction in a case where an error in the position hit by the ink droplets discharged from the nozzle detected by the detection unit is a first threshold or less.

8. The inkjet recording apparatus according to claim 7, wherein the detection unit detects brightness information on the image recorded using the ink droplets discharged from the plurality of nozzles, and a nozzle to be subjected to the non-discharge correction by the non-discharge correction unit is detected in accordance with the brightness information on the image detected by the detection unit.

9. The inkjet recording apparatus according to claim 1, wherein the detection unit detects brightness information on the image recorded using the ink droplets discharged from the plurality of nozzles, and a nozzle to be subjected to the non-discharge correction by the non-discharge correction unit is detected in accordance with the brightness information on the image detected by the detection unit.

10. The inkjet recording apparatus according to claim 1, wherein the change unit binarily changes the tone, at which the non-discharge correction unit performs the non-discharge correction for the defective nozzle, in accordance with an operation by a user.

11. The inkjet recording apparatus according to claim 1, wherein the change unit outputs a first test image with execution of the non-discharge correction for the defective nozzle by the non-discharge correction unit and a second test image without execution of the non-discharge correction, to allow a user to see the first and second test images and make a binary change as to whether or not the non-discharge correction unit performs the non-discharge correction for the defective nozzle.

12. An inkjet recording method comprising:

discharging, by a plurality of nozzles, ink droplets in accordance with image information to record an image on a recording medium;

detecting a defective nozzle from the plurality of nozzles;

disabling the detected defective nozzle from discharge and correcting an amount of ink droplets from a nozzle that is adjacent to the nozzle disabled from discharge; and binarily changing whether or not the nozzle is disabled from discharge in accordance with a tone of the image information.

13. An inkjet recording apparatus comprising:

a plurality of nozzles that discharge ink droplets in accordance with image information to record an image on a recording medium;

detection means for detecting a defective nozzle from the plurality of nozzles;

non-discharge correction means for performing non-discharge correction in which the defective nozzle detected by the detection means is disabled from discharge and an amount of ink droplets from a nozzle that is adjacent to the defective nozzle is corrected; and change means for binarily changing whether or not the non-discharge correction means performs the non-discharge correction in accordance with a tone of the image information.

* * * * *